(12) United States Patent
Eck et al.

(10) Patent No.: US 9,367,694 B2
(45) Date of Patent: Jun. 14, 2016

(54) PROBABILISTIC CYBER THREAT RECOGNITION AND PREDICTION

(71) Applicant: Raytheon BBN Technologies Corp., Cambridge, MA (US)

(72) Inventors: Christopher R. Eck, Dunedin, FL (US); Suzanne P. Hassell, Clearwater, FL (US); Brian J. Mastropietro, Springfield, VA (US); Paul F. Beraud, III, Parrish, FL (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 14/279,869

(22) Filed: May 16, 2014

(65) Prior Publication Data
US 2015/0332054 A1   Nov. 19, 2015

(51) Int. Cl.
G06F 21/57 (2013.01)
G06F 21/55 (2013.01)
H04L 29/06 (2006.01)

(52) U.S. Cl.
CPC ............ *G06F 21/577* (2013.01); *G06F 21/552* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 6,535,227 B1 * | 3/2003 | Fox ........................ | H04L 41/20 709/223 |
| 8,490,193 B2 | 7/2013 | Sarraute et al. | |
| 8,490,196 B2 * | 7/2013 | Lucangeli Obes .... | G06F 21/577 726/23 |
| 8,515,881 B2 * | 8/2013 | Schwoegler ............. | G06N 5/02 706/12 |
| 8,601,587 B1 * | 12/2013 | Powell .................. | G06F 21/552 726/25 |
| 2008/0144835 A1 * | 6/2008 | Roy ..................... | H04L 63/1433 380/278 |
| 2012/0036093 A1 | 2/2012 | Gleason | |
| 2012/0233698 A1 * | 9/2012 | Watters ................. | G06F 21/577 726/25 |
| 2012/0245449 A1 * | 9/2012 | Williams ........... | A61N 1/36046 600/377 |
| 2015/0046384 A1 | 2/2015 | Eck | |

OTHER PUBLICATIONS

Schwoegler, S., et al., "On the Application of Multiple Hypothesis Tracking to the Cyber Domain", 14th International Conference on Information Fusion (Chicago, Illinois, Jul. 5-8, 2011), 247-252.

(Continued)

*Primary Examiner* — Kaveh Abrishamkar
(74) *Attorney, Agent, or Firm* — Schwegman Lundberg & Woessner, P.A.

(57) ABSTRACT

Generally discussed herein are systems, apparatuses, or processes to recognize that a cyber threat exists or predict a future track of a cyber threat in a network. According to an example, a process for recognizing a cyber threat can include (1) determining a network layout of a network based on received network layout data, (2) receiving cyber sensor data indicating actions performed on the network, (3) calculating a first score associated with the cyber sensor data indicating that a cyber threat is present in the network by comparing a cyber threat profile of the cyber threat that details actions performed by the cyber threat to actions indicated by the cyber sensor data, (4) determining whether the calculated first score is greater than a specified threshold, or (5) determining that the cyber threat is present in response to determining the calculated first score is greater than the specified threshold.

17 Claims, 8 Drawing Sheets

(56) References Cited

OTHER PUBLICATIONS

Berlingerio, Michele, et al., "Mining Graph Evolution Rules", *ECML PKDD '09 Proceedings of the European Conference on Machine Learning and Knowledge Discovery in Databases: Part I*, (2009), 16 pgs.

Conway, Drew, "Modeling Network Using Graph Motifs", Arxiv preprint arXiv:1105.0902, (May 5, 2011), 1-33.

Eck, Charles, "Predicting Edges in Temporal Network Graphs Described by Near-Bipartite Data Sets", U.S. Appl. No. 13/963,439, filed Aug. 9, 2013, 40 pgs.

Faloutsos, Michalis, et al., "On Power-Law Relationships of the Internet Topology", *Proceedings of the Conference on Applications, Technologies, Architectures, and Protocols for Computer Communication* (SIGCOMM '99), (1999), 12 pgs.

Snijders, Tom A. B., et al., "Maximum Likelihood Estimation for Social Network Dynamics", *The Annuals of Applied Statistics*. 4(2), (2010), 567-588.

Xu, Jennifer, "The Topology of Dark Networks", *Communications of the ACM*, 51(10), (Oct. 2008), 58-86.

\* cited by examiner

700

| TIME | T0 | T1 | T2 | T3 | T4 | T5 | T6 | T7 | T8 | T9 | T10 | T11 |
|---|---|---|---|---|---|---|---|---|---|---|---|---|
| EVIDENCE | α | | | | | β | | | | | γ | |
| THREAT A | α | | β | | γ | | | | | | | |
| THREAT C | β | | | | | γ | | | | | | η |

702 — TIME row
704 — EVIDENCE row
706A — THREAT A row
706B — THREAT C row

*FIG. 7*

PROBABILISTIC CYBER THREAT RECOGNITION AND PREDICTION

TECHNICAL FIELD

Examples generally relate to probabilistically detecting a cyber threat or probabilistically predicting a next target or action to be performed by the cyber threat.

TECHNICAL BACKGROUND

Cyber threat prevention or remediation is typically very "reactive" in that cyber attacks happen, expose a vulnerability, and in response thereto, a new defense is devised and then distributed. Many techniques for cyber threat prediction or detection rely on determining an entry point and a goal for the threat. Some common cyber threat analysis tools, such as Security Information Event Management (STEM) systems, use a rule set that specifies conditions that, when met, indicate that a cyber threat exists. If one of the conditions in the rule set is not met, or there is a departure from what the rule set defines, then the analysis tools will not detect that a cyber threat exists.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

FIG. 7 shows a block diagram of more cyber threat profiles, according to one or more embodiments.

DESCRIPTION OF EMBODIMENTS

Figure 1:
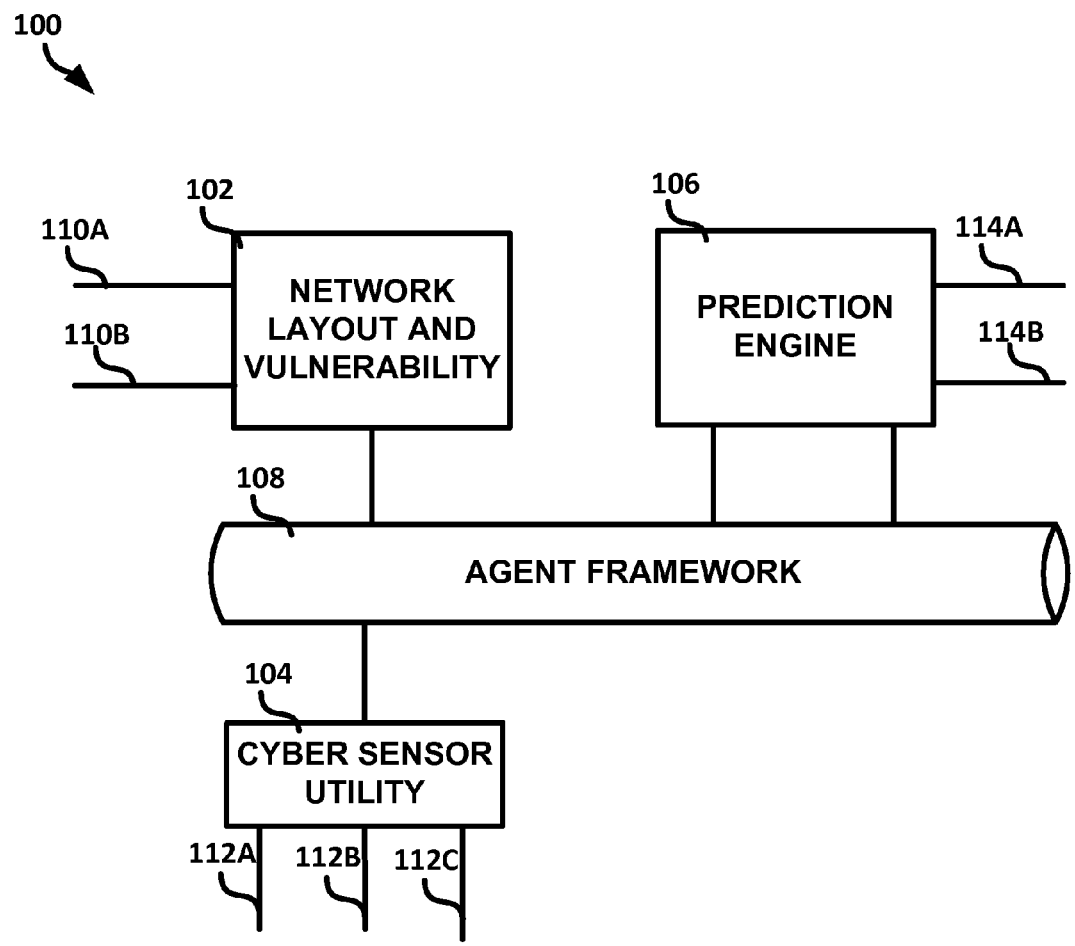
FIG. 1 shows a block diagram of a cyber threat analysis system, according to one or more embodiments.

Embodiments in this disclosure generally relate to probabilistically determining if a cyber threat exists or probabilistically determining a future path or action to be performed by the cyber threat. A cyber threat analysis system can take computer or other device network layout data, cyber threat profile data, or cyber sensor data as an input and produce a probabilistic prediction (e.g., based on a calculated score) of whether a cyber threat exists or where a possible cyber threat will propagate in a network based on the data.

Data is available that can be used to anticipate a cyber attack or anticipate an end result of the cyber attack. By anticipating a result, effects for offensive and defensive cyber operations can be better applied or more effective. By moving away from a "reactive" stance to a more "active" or "proactive" stance, a cyber threat can be detected earlier and a cyber threat adversary can have a more difficult time carrying out their threat. Also, earlier detection can increase the time to respond to the cyber threat, decrease down time from actions performed by the cyber threat, or mitigate the damage caused by the cyber threat.

In accord with one or more embodiments, data regarding network configuration or properties is ingested (e.g., by using Nessus®, such as a Commercial off the Shelf (COTS) version of Nessus®). A vulnerability associated with a network asset (e.g., a network node or device) can be ingested (e.g., as Common Vulnerabilities and Exposures (CVEs) data). The data can be stored (e.g., in as format, such as graphml that describes nodes and edges as well network graph characteristics) and made available to a prediction engine via an agent framework. Updates to the network data can be handled by a cyber sensor data module which can ingest data from cyber sensors, such as ArcSight®. The data can be formatted or adapted, such as by the agent framework or prior to sending the data to the prediction engine. The cyber sensor data can be made available to the prediction engine, such as through the agent framework.

The prediction engine can estimate the current state of the network or of a cyber threat. The prediction engine can predict a future state of the network or cyber threat, such as to track a cyber threat as it evolves. The prediction engine can evaluate or combine multiple prediction models simultaneously. A situation (i.e. a collection of evidence mapped or assigned to one or more threats) can be recognized, such by determining that a set of evidence matches a threat profile with a probability that is greater than (or equal to) a specified threshold. By specifying a lower probability threshold, a user can provide a more secure network environment, such as at the cost of creating more alerts. The data consumed by the prediction engine can be transformed so as to make processing the data faster. The prediction engine can predict, in real-time or near real-time, if a cyber threat exists. The capabilities can be performed without specifying a network entry point or threat goal a priori.

One or more embodiments discussed herein can leverage processes from different domains (e.g., Kalman filtering, Interacting Multiple Models (IMMs), Multiple Hypothesis Management (MHM), or Graph Theoretic processes, among others). The embodiments can apply one or more of the processes in the cyber domain, such as to help predict if a cyber threat exists, where the cyber threat will propagate, detect a new type of cyber threat, or detect if multiple cyber threats are present.

In contrast to previous cyber threat analysis tools, one or more cyber threat analysis tools discussed herein can probabilistically determine whether a cyber threat exists or probabilistically determine a future track for the cyber threat. One or more of the cyber threat analysis tools discussed herein can detect a hybrid cyber threat that is a combination of previously known cyber threats. One or more of the cyber threat analysis tools can detect a cyber threat despite missing or not receiving a piece of evidence expected for the cyber threat, such as can be detailed in the cyber threat profile of the cyber threat.

One or more of the cyber threat analysis tools discussed herein can distinguish or recognize a cyber threat based on a temporal propagation of the cyber threat. One or more of the cyber threat tools discussed herein can predict a probability of a given node being affected by a cyber threat and the evidence that the threat may leave behind, such as an active cyber threat. Other advantages can be realized using a process, system, or apparatus discussed herein.

FIG. 1 shows a block diagram of an example of a cyber threat analysis system 100. The system 100 can include a network layout or vulnerability module 102, an agent framework module 108, a cyber sensor utility module 104, or a prediction engine 106.

The network layout or vulnerability module 102 can take network configuration data, such as from the computer program Nessus®, as an input 110A or 110B. This data can be used to determine a computer network topology. The network layout or vulnerability module 102 can take vulnerability data, such as CVE data, as an input 110A-B. This data can be used to determine a vulnerability of the network or how a network node is affected by a particular type of cyber threat.

A profile of a cyber threat can include data detailing a cyber threat (e.g., a cyber threat profile). This data can include a timeline of how the cyber threat behaves, evidence from an action that the cyber threat is known to perform (i.e. evidence that the cyber threat leaves behind), or other known information regarding a cyber threat.

The cyber threat profile information can include data that describes the temporal or evidential data (e.g., a trace on a node of the computer network) that describes the evolution, movement, or evidence from actions performed by a cyber threat. The cyber threat profile information can specify a threat progression over time, such as by detailing evidence left behind by the cyber threat or timing of when the evidence was left behind or time between pieces of evidence being left behind. Temporal data can include time information regarding a time gap between evidence being created. Evidence can include data related to a trail left by a cyber threat, such as a security or application log being created, a login attempt, a file or program being accessed, a program being run, or other evidence that can be left by a cyber threat, such as footprinting (i.e. determining a layout of at least a portion of a computer network), scanning, enumeration, gaining access to the system, escalating a user's privilege status, or exploitation, among others.

The threat profile can be used to help indicate a score (e.g., probability) that the entity producing the cyber threat is aware of an exploit at a particular node. The threat profile can include an affinity factor that is based on a likelihood that a particular node will be targeted by a cyber threat based on a variety of factors. For example, the affinity factor can be higher for a node that is important for the operation of the network. For example, it is more likely that a central hub node will be a target of a cyber threat as compared to a spoke node, because the cyber threat can potentially access more data or nodes through the central hub node than through the spoke node.

The network layout or vulnerability module 102 can produce a graph of nodes of a computer network based on the computer network topology or vulnerability data. Such a graph can be presented to a user via a display so that the network or the network's vulnerabilities can be visualized in an easy to understand format. A vulnerability can include (1) a configuration that allows a user (e.g., hacker) to control or access data (e.g., proprietary, classified, or other sensitive data such as data which the user is not authorized or does not have sufficient privileges to access); (2) a misconfiguration of the network (e.g., a missing patch or an open mail relay, among others); (3) insufficient password complexity, a non-existent password, or a password with a common word in it, among others; (4) denial of service against the protocol stack (e.g., Transmission Control Protocol (TCP)/Internet Protocol (IP) stack); or (5) preparation of an audit of a Payment Card Industry Data Security Standard (PCI DSS), among others. The vulnerability can be documented in a repository, such as a CVE repository. The repository can include information regarding a security vulnerability in a software package or hardware of a device.

The cyber sensor utility module 104 can consume cyber sensor data, such as can be received on an input 112A, 112B, or 112C (e.g., live cyber sensor data). The cyber sensor data can detail data regarding a cyber activity. The cyber sensor data can be generated, for example, from a program such as Nessus®, ArcSight, QRadar®, or Snort®, among others, although the scope of the embodiments is not limited in this respect, as any hardware, program, or technique that produces cyber sensor data can be used. The cyber sensor data can include user activity monitoring data, threat or risk management data, network log data, traffic analysis data, packet logging data (e.g., on an IP network or File Transfer Protocol (FTP) network). The cyber sensor data can include traffic data, such as can be used to help determine if a latency-sensitive application is being bombarded with traffic. The cyber sensor data can include data that can be used to help detect a cyber threat, such as an Operating System (OS) fingerprinting operation, a common gateway interface, a buffer overflow, a server message block operation, or a stealth port scan, among others.

Nessus® is a vulnerability scanner tool developed by Tenable Network Security. ArcSight is a suite of software programs developed by ArcSight® of Cupertino, Calif. Snort® is an open source cyber threat scan tool developed by Sourcefire, Inc. of Columbia, Md. QRadar® is a network security tool from IBM® of Armonk, N.Y. QRadar® can analyze log information, user flow, a network vulnerability, or user or asset data to detect or identify a network vulnerability.

The prediction engine 106 can receive cyber sensor, network layout, or vulnerability data and determine, probabilistically, if a cyber threat exists. The prediction engine 106 can determine, probabilistically, a future path (i.e. track) of a cyber threat. The prediction engine 106 can determine, probabilistically, based on the cyber sensor data, network layout information, or vulnerability information if multiple cyber threats exist or if a hybrid cyber threat exists. A hybrid cyber threat can include a combination of two or more known cyber threats, such as a cyber threat detailed in CVE or CPE repository or a cyber threat profile. The prediction engine 106 can help determine that a cyber threat exists without receiving all pieces of evidence that are expected from the cyber threat, such as can be detailed in a cyber threat profile of the cyber threat. That is, a cyber threat can be detected despite missing a piece of evidence (e.g., temporal or action evidence, such as an action at a node (e.g., a device such as a computer or other component of a device network) that can be detected or logged).

An MHM process, such as can be similar to that detailed in U.S. Pat. No. 8,515,881, which is incorporated by reference herein in its entirety, can be used to help determine if multiple cyber threats exist. An IMM process can be used to help determine if a hybrid cyber threat exists. A cyber threat can be detected in spite of missing evidence by using a Kalman Filtering process. A graph theoretic process or a Kalman filtering process can be used to help determine a track of a given cyber threat.

The agent framework 108 can provide a channel through which the network layout and vulnerability module 102, cyber sensor utility module 104, or the prediction engine 106 can communicate to each other. The agent framework 108 can format data from the network layout and vulnerability module 102, cyber sensor utility module 104, or the prediction engine 106 in a form that is compatible with another item that is coupled to the agent framework 108.

Figure 2:
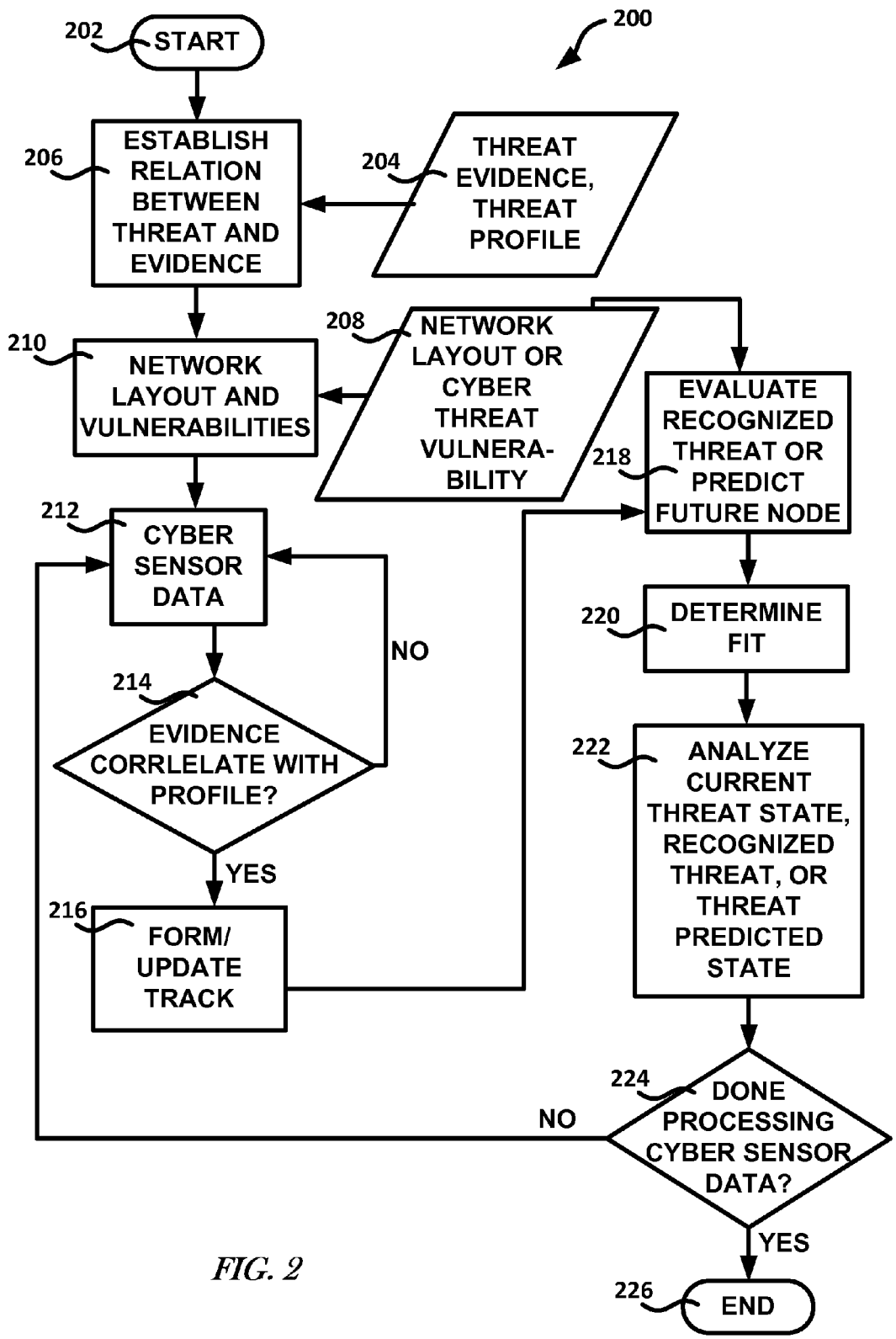
FIG. 2 shows a flow diagram of a process for cyber threat analysis, according to one or more embodiments.

FIG. 2 shows a flow diagram of an example of a cyber threat prediction, situation recognition, or cyber threat tracking process 200, according to one or more embodiments. The process 200 can use data from a cyber sensor (e.g., Nessus®, CVE, or CPE, among others) to determine a network layout or a network vulnerability. The process 200 can use cyber sensor data (e.g., ArcSight, QRadar, Snort®, and other Security Information and Event Management (SIEM) data) as evidence to form a probabilistic assessment of a cyber threat's existence or a cyber threat track. The score (e.g., probability or other relative numerical system) can be determined by comparing the cyber sensor data to a cyber threat profile of the cyber threat. The score can increase the closer the cyber sensor data matches expected actions of the cyber threat detailed in the cyber threat profile.

The process 200 can consume data related to a cyber threat along with the associated evidence and evolution of the evidence over time. By using a temporal component, a cyber threat that progresses slowly can be distinguished from a cyber threat that progresses faster, such as despite overlapping evidence between the possible cyber threats. The process 200 can help to recognize a threat situation (e.g., a collection of cyber threat evidence organized in a manner to correlate the threat with one or more cyber threat profiles that details a cyber threat evolution, such as can be based on time) based on a calculated score.

The process 200 can begin at 202. At 204, cyber threat evidence, a time-based cyber threat profile of a cyber threat, an evidential cyber threat profile, or a combination thereof can be received. At 206, a relation between a known cyber threat and the evidence it leaves behind (e.g., cyber sensor data) can be established. At 208, network layout and cyber threat vulnerability information can be received. The network layout information can include Nessus® data. The cyber threat vulnerability data can include CVE or Common Platform Enumeration (CPE) data. A network layout configuration or a vulnerability of a network can be determined at 210, such as can be based on the network layout or cyber threat vulnerability data.

Cyber sensor data can be received at 212. At 214, it can be determined (e.g., probabilistically determined) whether there is a sufficient correlation between the cyber sensor data and a cyber threat profile so as to determine a likelihood that a cyber threat exists. If the correlation between the cyber threat profile and the cyber sensor data is not sufficient it can be determined that a cyber threat is likely not present. More cyber sensor data can be received. If there is a sufficient correlation between the cyber threat profile and the cyber sensor data, a track for the possible cyber threat can be updated or formed at 216. A track for a cyber threat can include a history of relative nodes or actions performed by the cyber threat. A track for the cyber threat can include a predicted future path (e.g., a next node or nodes to be affected by the cyber threat) or action of the cyber threat.

At 218, the cyber threat can be evaluated to determine whether it is a cyber threat that was previously known (e.g., by comparing the evidence left by the cyber threat to a profile of a previously known cyber threat) or a future node or action of the cyber threat can be predicted. The future node or action can be predicted by comparing, at 220, the cyber sensor data related to the cyber threat to a known cyber threat profile and extrapolating the previously known cyber threat behavior detailed in the cyber threat profile to the currently detected or predicted cyber threat, such as if a sufficient correlation between the currently detected cyber threat and the previously known cyber threat exists.

At 222, the current state of the detected cyber threat can be determined or predicted. If it is determined that the current cyber threat is substantially similar to a previous cyber threat and the previous cyber threat is known to access a certain node, then it can be determined, probabilistically, that the current cyber threat will behave similarly. A future action of the cyber threat can be determined by analyzing the network layout topology and predicting where the cyber threat will propagate or act based on the importance of the nodes in the network layout topology. Some nodes of a network are more likely to be targeted by a cyber threat because of the importance that they have on the functioning of the network. This information can be exploited to predict where a cyber threat will propagate or what action the cyber threat can take next.

At 224, it can be determined whether all the cyber sensor data has been processed. If all of the cyber sensor data has been processed, the process 200 can end at 226. If there is more cyber sensor data to be processed, the process 200 can continue at 212.

Figure 3:
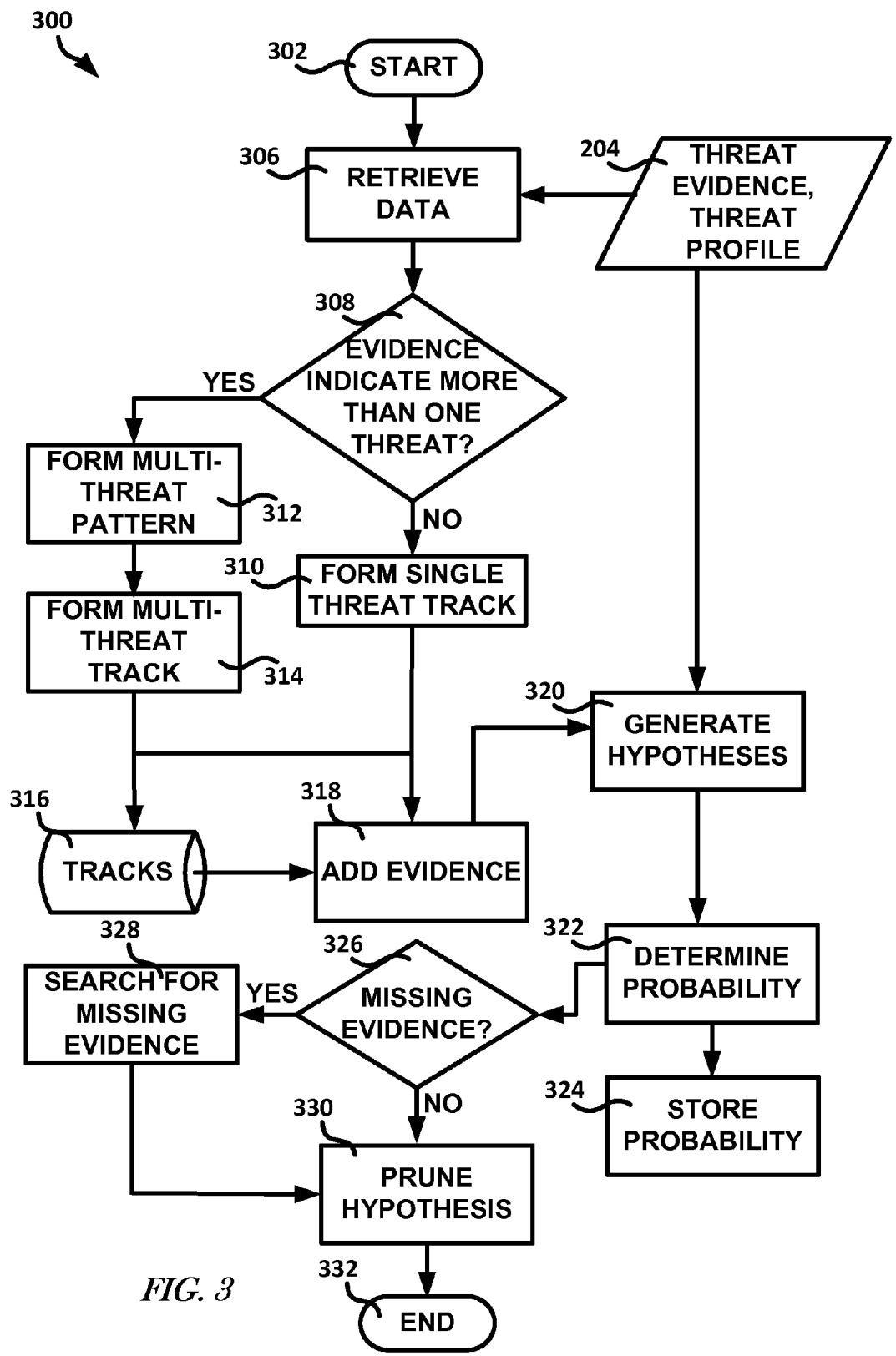
FIG. 3 shows a flow diagram of a process for forming a track, according to one or more embodiments.

FIG. 3 shows a flow diagram of a process 300 for forming or updating a track of a cyber threat, such as can be similar to the operation at 216 of FIG. 2, according to one or more embodiments. The process 300 can form and evaluate one or more hypotheses for evidence combinations (e.g., received cyber sensor data can be considered evidence), such as to form a prediction of whether a cyber threat exists or the nature of a possible threat. The process 300 can attempt to evaluate whether a new cyber threat that does not have its own threat profile is present. The new cyber threat can be a hybrid cyber threat that is a combination of two or more previously known cyber threats that have a threat profile.

The process 300 can use Multiple Hypothesis Tracking (MHT) to form a feasible combination of evidence or a track and score (e.g., determine a probability for) each combination. The process 300 can consider the temporal evolution of cyber threat evidence and a cyber threat profile in determining the score. The process can use an IMM process to help detect a hybrid threat that does not currently have a threat profile. The process 300 can detect that a cyber threat exists (e.g., determine there is a score that is above a specified threshold) despite missing evidence from the threat profile, such as by using a Kalman Filter. Thus, the threat profile can help define particular threat evidence and behavior of a cyber threat, but can allow for some behavior that departs from the profile. The process 300 can provide a score (e.g., a probability) for a given threat profile and evidence fit. The process 300 can use one or more processes typically employed in the air defense domain for cyber threat detection or prediction in the cyber domain.

The process can begin at 302. At 306, data related to a cyber threat track, a cyber threat profile, or cyber threat evidence can be retrieved, such as from 204. At 308, it can be determined whether the cyber threat evidence indicates that more than one cyber threat is present. A new (e.g., hybrid cyber threat) cyber threat profile can be created, such as if the cyber threat evidence indicates that more than one cyber threat exists. If the evidence does not indicate that more than one cyber threat exists, one or more single cyber threat tracks can be formed at 310. If the evidence does indicate that more than one cyber threat exists, one or more multi-cyber threat patterns can be formed at 312. At 314, a multi-cyber threat track can be formed, such as can be based on the received evidence or the multi-cyber threat pattern formed at 312. A multi-cyber threat pattern can include a plurality of single cyber threat profiles. At 316, any new cyber threat profiles or patterns that have been created and are not already present in a track repository (e.g., a track database), can be stored in the track repository.

At 318, evidence can be added to a track. The evidence can include a next expected piece of evidence based on a cyber threat profile or track. The evidence can include evidence that was received at 306. At 320, one or more hypotheses can be generated. These hypotheses represent combinations of evidence with potential cyber threats. Each hypothesis can include whether a cyber threat exists, what type of cyber threat exists, the threat profile of a cyber threat, a future action of a predicted cyber threat, a next piece of evidence to be left by a cyber threat, or a combination thereof, among others. At 322, a score indicating that one or more hypotheses are correct can be determined. The score can be determined based on the cyber threat profile hypothesis (e.g., a temporal or evidential cyber threat profile hypothesis), present evidence left by the cyber threat, or the network layout or vulnerability data, among others.

The score can be determined by comparing the cyber threat profile to the evidence left by the cyber threat. The determined score can be stored at 324. There are a number of ways to calculate the score associated with an accumulation of evidence matching one or more threat profiles that depend on the characteristics of the cyber threat profile. One such threat profile can describe the cyber threat hopping zero, one, or more than one adjacent node between consecutive pieces of evidence. In such a profile, the score for a single hypothesis could be calculated, for example, as follows:

$$\ln\left(\frac{P_D}{2\pi P_{FA}}\frac{C}{\sqrt{|\sigma|}}\right) - \frac{1}{2}\frac{(\Delta h)^2}{\sigma^2}$$

where $P_D$ is the probability of detection for a piece of evidence, $P_{FA}$ is the probability of false alarm for a piece of evidence, C represents the threat density in the network, σ is the error variance for the threat, and Δh is the number of adjacent nodes (hops) between the node of the last observed evidence and the node of the current observed evidence.

At 326, it can be determined if evidence is missing for a given hypothesis. If evidence is missing, then an alert can be sent to prompt a user to search for the missing evidence at 328. At 330, a hypothesis or the number of hypotheses can be pruned. Since a large number of potential combinations of evidence to threats (i.e. hypotheses) can be generated for a single piece of evidence, pruning can be employed to manage the number of such combinations and still remain computationally responsive. There are many pruning techniques that can include, for example: pruning potential threats that are below a minimum score, pruning by retaining only a certain number of hypotheses, etc. A pruned hypothesis can be stored in the track repository. The score associated with a given pruned or unpruned hypothesis can be stored in the track repository. The process 300 can end at 332.

Figure 4:
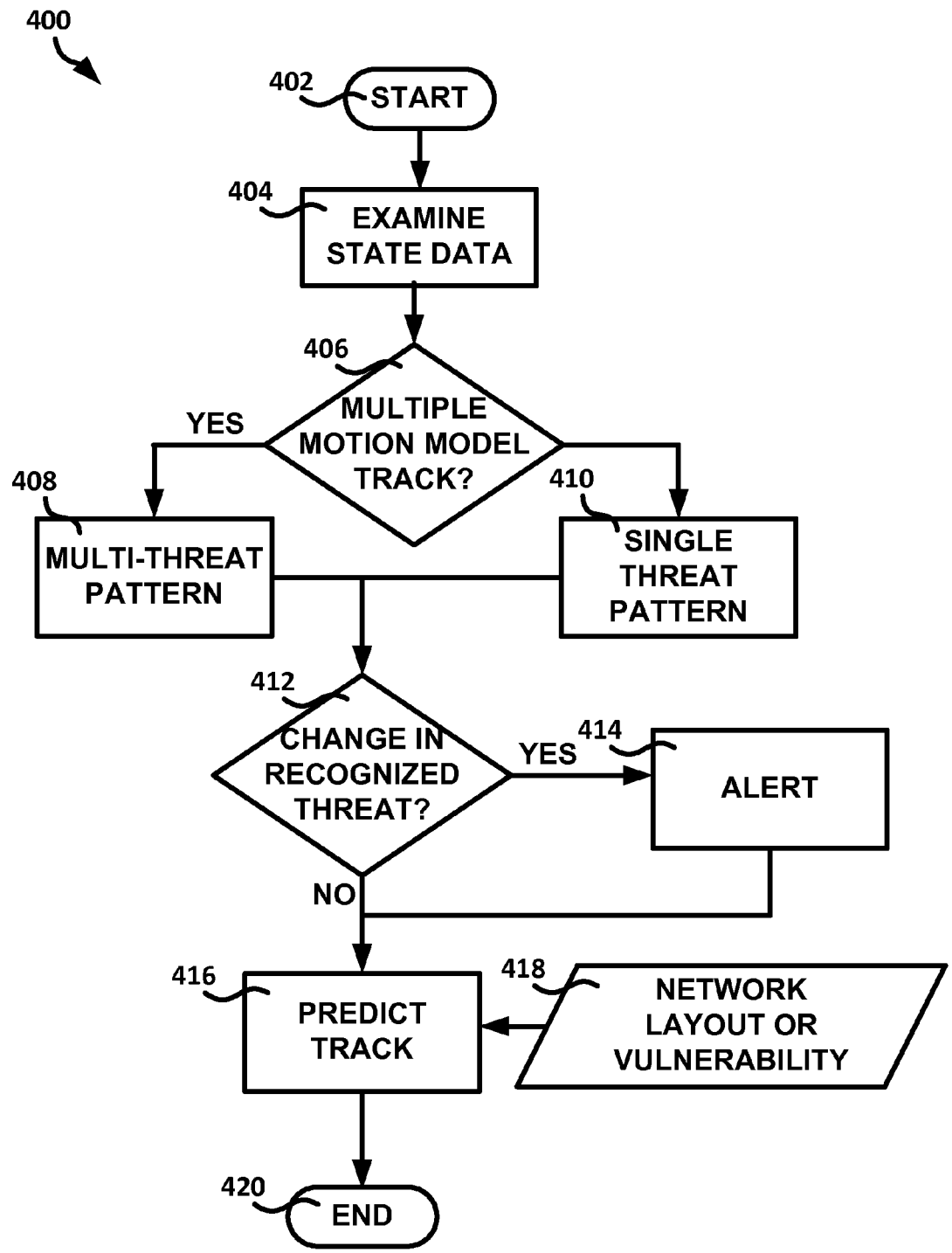
FIG. 4 shows a flow diagram of a process for evaluating a threat or predicting a future node to be attacked by the cyber threat, according to one or more embodiments.

FIG. 4 shows a flow chart of a process 400 for evaluating a cyber threat or predicting a node the cyber threat will target, such as can be similar to the operation at 218 of FIG. 2. The process 400 can help determine a fit or match of cyber threat evidence to a cyber threat profile. The process 400 can help identify a situation or state of a cyber threat that is likely being experienced by a network. The process 400 can consider a hybrid cyber threat, such as two cyber threats that include at least one piece of evidence (e.g., as indicated by a cyber threat profile) in common. The process 400 can consider a vulnerability (e.g., as delineated in a CVE or CPE that describes a vulnerability of an application, OS, or hardware) in creating a cyber threat hypothesis or in predicting the progression of a cyber threat through the network.

The presence of a vulnerability, such as can be indicated by a CVE or a CPE, at a particular node can enhance the probability of a particular cyber threat (e.g., a cyber threat that exploits the vulnerability) attacking that node. Thus, the probability of that particular node being attacked can increase with the presence of a known vulnerability or with a possible vulnerability that a cyber threat is known to exploit. In evaluating the probability of a particular node being subject to future attack, a collection of predicted cyber threats present in the network can be projected or predicted forward in time, and the total probability of a given node being targeted by a cyber threat can be aggregated from the probability of attack from multiple predicted cyber threats. A prediction can thus consist of a probability of attack from each cyber threat based on the predicted or received evidence, as well as the aggregate probability from all cyber threats at each node.

The process 400 can begin at 402. At 404, state data of a cyber threat can be examined (e.g., a cyber threat profile can be examined and compared to the received cyber sensor data (i.e. evidence)). The state data can be compared to a network layout or a cyber threat track. At 406, it can be determined whether the cyber threat corresponds to multiple cyber threat profiles. If the cyber threat is determined to be multiple cyber threats then one or more multi-cyber threat patterns can be predicted at 408. If the cyber threat is determined to not be multiple cyber threats then one or more single cyber threat patterns can be predicated at 410. Both the multiple cyber threat pattern and the single cyber threat pattern can include a hybrid cyber threat pattern (i.e. profile). At 412, it can be determined if there is a change in a hypothesis or a recognized cyber threat. At 414, an alert can be sent to a user if there is a change in a hypothesis or a recognized threat. The cyber threat profile of the recognized cyber threat can be stored, such as in the track repository.

At 416, a future track of a predicted cyber threat can be predicted. The prediction can be based on received network layout, vulnerability data, received evidence, expected evidence, or a cyber threat profile, such as data that can be received at 418. The probability that a hypothesized cyber threat matches received evidence can be augmented based on the received network layout or vulnerability information. The process 400 can end at 420.

Figure 5:
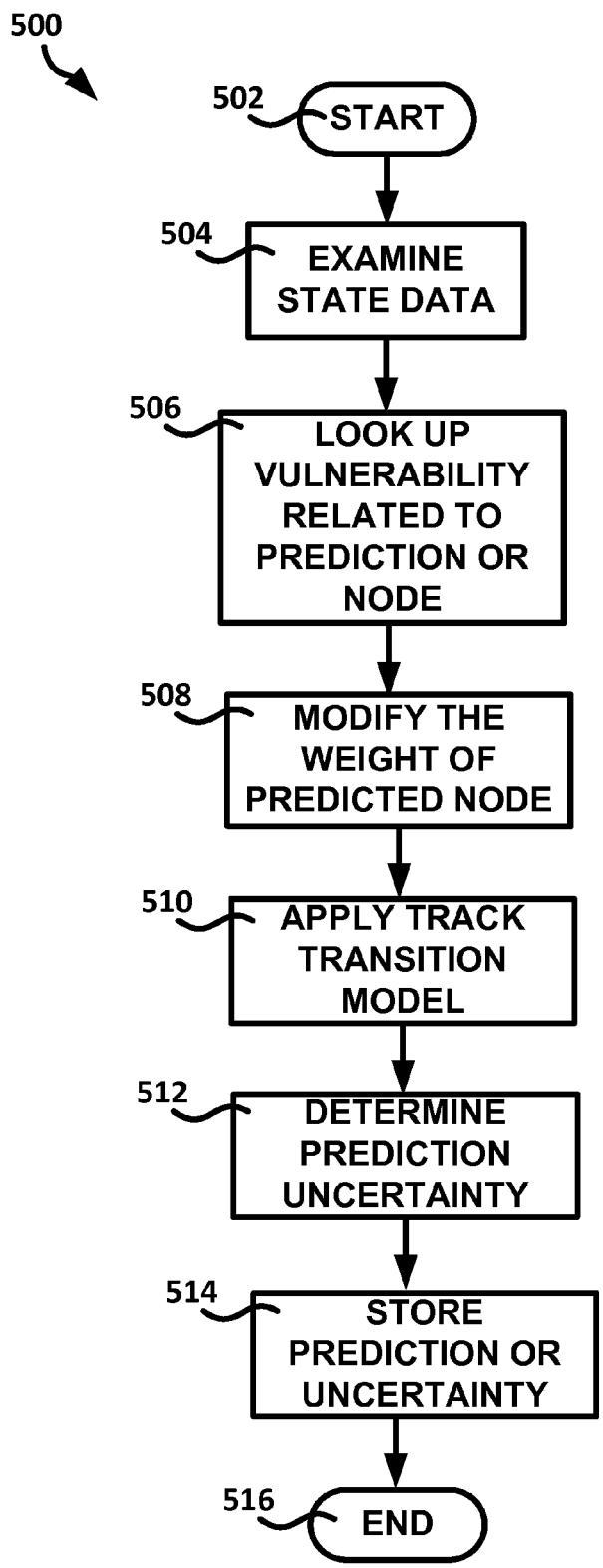
FIG. 5 shows a flow diagram of a process for predicting a future track for the cyber threat, according to one or more embodiments.

FIG. 5 shows a flow diagram of a process 500 for predicting a future track of a cyber threat, such as can be similar to the operation performed at 416. The process 500 can consider a presence of a known vulnerability in a network when evaluating the score of a node being attacked in the future. Using an IMM process a hybrid threat profile can be created and evaluated, such as to help determine a progression of a cyber threat. Using the IMM, a combination of cyber threats (e.g., a weighted combination of cyber threats) can be considered and it can be determined which combination of cyber threats or singular cyber threat forms the best fit to the evidence presented by a proposed cyber threat. These same best fit weights can be used to extrapolate the cyber threat progression forward in time, such as at multiple future time steps. Additionally, an uncertainty in the predictions can be generated. The uncertainty or score can be used to help determine a cause of action to remedy or stop the cyber threat or whether a cause of action exists.

At 502, the process 500 can start. At 504, the current state data of a predicted cyber threat can be analyzed. At 506, a vulnerability related to a cyber threat prediction, a node affected by a cyber threat, or a node near a node affected by the cyber threat can be determined. At 508, a weight indicating the likelihood that a node will be affected by the cyber threat can be modified based on the presence of a known vulnerability or the node's proximity to an affected node.

At 510, a cyber threat transition model (e.g., a next piece of evidence expected from a cyber threat) can be predicted. The weight or prediction can be determined using a network graph theoretic process (e.g., a shortest path or m-hop neighbor operation) in determining a weight or making a prediction. At 512, an uncertainty in the prediction can be determined. The prediction or the uncertainty can be stored at 514. The process 500 can end at 516.

Figure 6A:
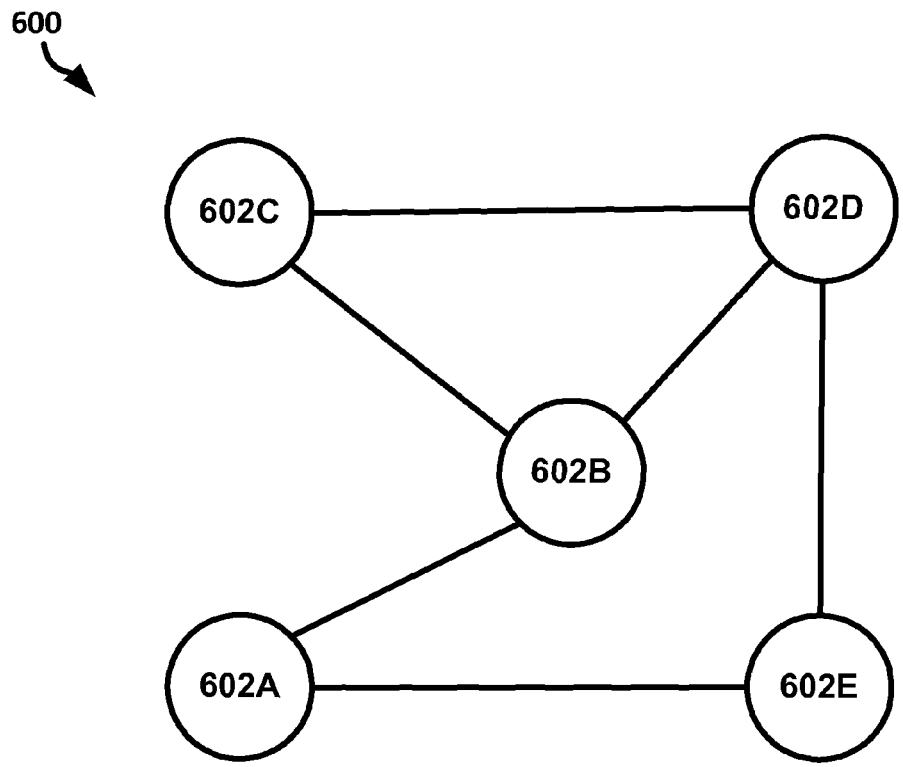
FIG. 6A shows a block diagram of a network, according to one or more embodiments.
Figure 6B:
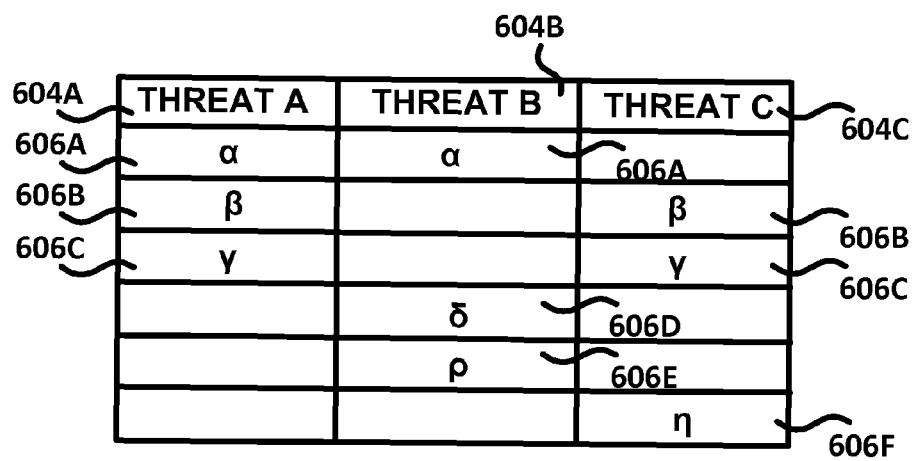
FIG. 6B shows a block diagram of cyber threat profiles, according to one or more embodiments.

FIG. 6A shows a block diagram of an example of a network layout 600 that will be used to describe an example of one or more process or systems discussed herein. The network layout 600 can include a plurality of nodes (e.g., devices, computers, or other network software or hardware whether virtual or real) 602A, 602B, 602C, 602D, or 602E. A line between two nodes 602A-E indicates a wired or wireless connection between the nodes 602A-E. FIG. 6B shows a block diagram of an example of cyber threat profiles 604A, 604B, and 604C, according to one or more embodiments. In the Examples, zero or one hops can occur between sequential evidence in a threat profile, but it will be appreciated that more hops are possible, such as in bigger networks. Each cyber threat profile 604A-C can include one or more associated pieces of evidence 606A, 606B, 606C, 606D, 606E, or 606F (e.g., cyber sensor data expected to be received if the cyber threat is present). The cyber threat profile 604A-C can include a time or range or times expected between receiving or detecting pieces of evidence (see FIG. 7).

Assume that a piece of evidence α is detected at node 602B. Based on the network layout 600, the cyber threat profiles, or the received evidence a prediction can be made to determine when the cyber threat will perform another action, what action the cyber threat will perform, or where the cyber threat will perform the next action. Some predictions that can be considered in this example include that the cyber threat is either threat A, threat B, or a combination of threat A and threat B. This is because the threat profiles 604A-B each include evidence α.

Based on the prediction that the cyber threat is threat A it can be predicted that the next piece of evidence that will be left by the cyber threat can include evidence β at node 602A, 602B, 602C, or 602D and the next piece of evidence after that will be evidence γ at any of nodes 602A, 602B, 602C, 602D, or 602E. Evidence β appearing at node 602E can be discarded as a hypothesis since the cyber threat would have to progress through, and presumably leave evidence at, either node 602A or 602D to get to node 602E.

Based on the prediction that the cyber threat is threat B, it can be predicted that the next piece of evidence that will be left by the cyber threat can include evidence δ at any of nodes 602A, 602B, 602C, or 602D and then evidence ρ at any of nodes 602A, 602B, 602C, 602D, or 602E.

To continue with the example, now assume that evidence β is detected at node 602D (after evidence α). A prediction of which cyber threat corresponds to the evidence seen thus far can include threat A, threat B, threat C, a combination of threats A and B, a combination of threats A and C, or a combination of threats A, B, and C, among others. Note that based on the evidence received thus far and the threat profiles of the known cyber threats, some of the predicted combinations can be more likely to be the cyber threat profile of the cyber threat than others. For example, in this scenario it is less likely that the cyber threat is consistent with threat B alone than it is that the cyber threat is consistent with threat A alone because threat A contains both evidence α and β while threat B only includes evidence α and does not include evidence β.

Based on the prediction that the cyber threat is threat A, it can be predicted that evidence γ will be experienced at any of nodes 602B, 602C, 602D, or 602E. Based on the prediction that the cyber threat is a combination of threat A and threat and threat B, it can be predicted that evidence γ, δ, or ρ, will be experienced at any of nodes 602B, 602C, 602D, or 602E. More predictions and tracks can be made based on the evidence, but these predictions and tracks have been left out of the explanation of this example for the sake of brevity.

FIG. 7 shows an example of a diagram 700 of cyber threat profiles and received evidence that include a temporal component. The diagram 700 includes a time line 702, evidence 704 received at specific times or time intervals on the time line 702, and one or more threat profiles 706A or 706B delineated by time expected to detect or receive evidence associated with the threat profile 706A-B. By delineating over time, it can be determined that a potential cyber threat with the evidence 704 can be a stretched out or slow instance of a cyber threat with threat profile 706A, that the cyber threat with evidence 704 is really an instance of a cyber threat with a cyber threat profile 706B with negligible evidence α, or that the cyber threat with evidence 704 is a cyber threat with a profile that is a combination of the profiles 706A and 706B, among others. By delineating in time, certain predictions regarding a potential cyber threat can be discarded or the score that the potential cyber threat matches a cyber threat profile can be reduced if the temporal characteristics of the evidence received do not sufficiently match the temporal evolution to be expected from a cyber threat with the predicted cyber threat profile. Similarly, if the temporal evidence sufficiently matches the temporal evolution detailed in the cyber threat profile, then the score that the cyber threat exists can be increased.

Figure 8:
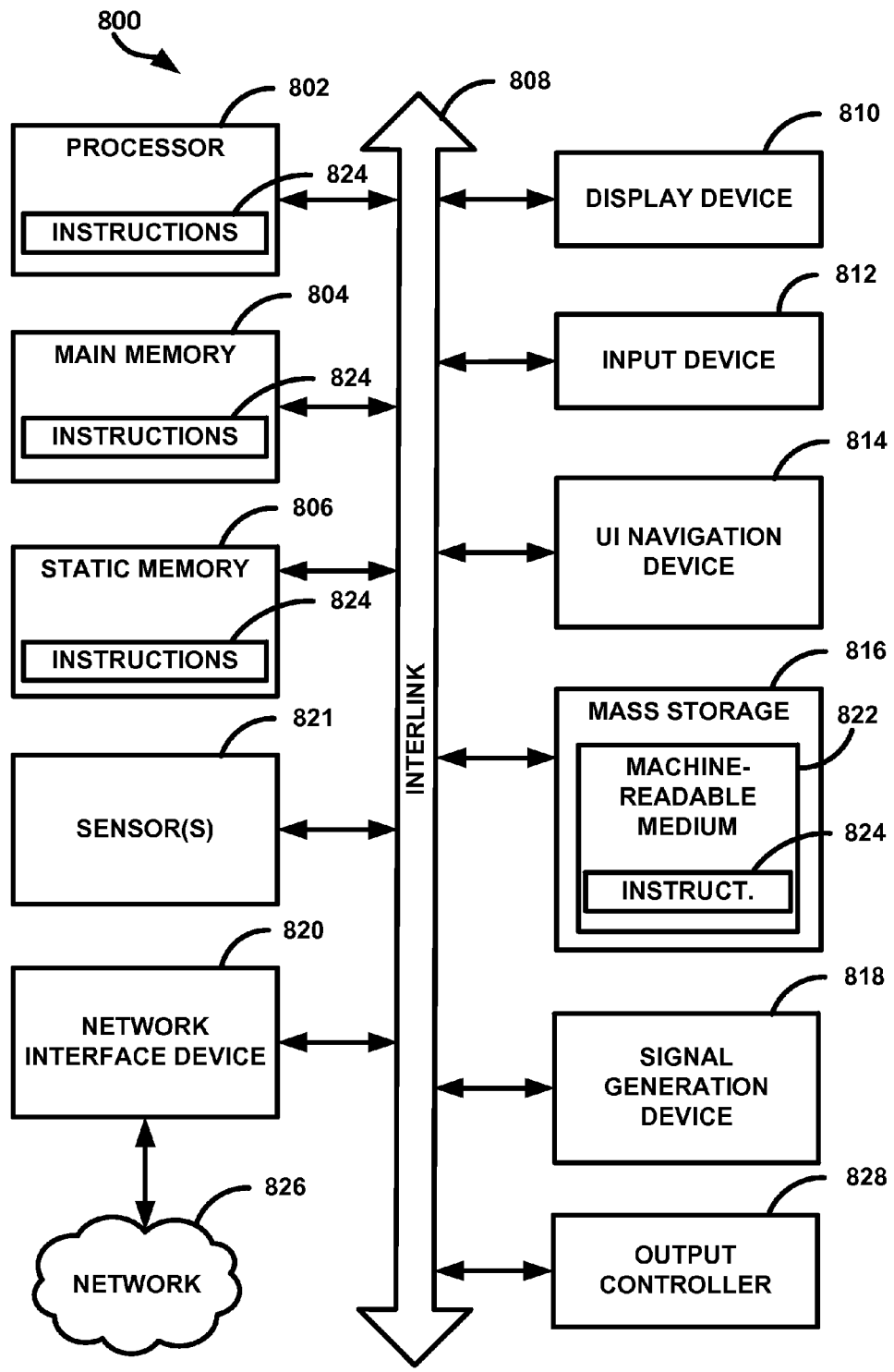
FIG. 8 shows a block diagram of an example of a machine upon which any of one or more processes (e.g., methods) discussed herein can be performed.

FIG. 8 illustrates a block diagram of an example machine 800 upon which any one or more of the process (e.g., methodologies) discussed herein can perform. In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the executions units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 800 can include a hardware processor 802 (e.g., a central processing unit (CPU), a graphics processing unit (GPU), a hardware processor core, or any combination thereof), a main memory 804 and a static memory 806, some or all of which can communicate with each other via an interlink (e.g., bus) 808. The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 816 can include a machine readable medium 822 on which is stored one or more sets of data structures or instructions 824 (e.g., software) embodying or utilized by any one or more of the process or functions described herein. The instructions 824 can also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 can constitute machine readable media.

While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the machine 800 and that cause the machine 800 to perform any one or more of the processes of the present disclosure, or that is capable of storing, encoding or carrying data structures used by or associated with such instructions. Non-limiting machine readable medium examples can include solid-state memories, and optical and magnetic media. In an example, a massed machine readable medium comprises a machine readable medium with a plurality of particles having resting mass. Specific examples of massed machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 can further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) process. The term "transmission medium" shall be taken to include any intangible medium that is capable of storing, encoding or carrying instructions for execution by the machine 800, and includes digital or analog communications signals or other intangible medium to facilitate communication of such software.

Examples and Notes

The present subject matter can be described by way of several examples.

Example 1 can include or use subject matter (such as an apparatus, a method, a means for performing acts, or a device readable memory including instructions that, when performed by the device, can cause the device to perform acts), such as can include or use (1) determining, using a processor, a network layout of a network based on received network layout data, the network layout data indicating connections between a plurality of nodes of the network, (2) receiving cyber sensor data indicating actions performed on the plurality of nodes of the network, (3) calculating, using the processor, a first score associated with the cyber sensor data indicating that a cyber threat is present in the network by comparing a cyber threat profile of the cyber threat that details actions performed by the cyber threat to actions indicated by the cyber sensor data, (4) determining whether the calculated first score is greater than a specified threshold, or (5) determining that the cyber threat is present in response to determining the calculated first score is greater than the specified threshold.

Example 2 can include or use, or can optionally be combined with the subject matter of Example 1, to include or use determining a vulnerability of a node of the plurality of nodes of the network and modifying the first score based on the proximity of the cyber threat to the vulnerability or based on the cyber threat being known to exploit the determined vulnerability.

Example 3 can include or use, or can optionally be combined with the subject matter of Example 2, to include or use probabilistically determining a future track of the cyber threat based on the network layout, cyber threat profile, and the determined vulnerability, wherein a second score of a given future track is weighted based on the cyber threat profile, the network layout, or an importance of the node to the performance of the network.

Example 4 can include or use, or can optionally be combined with the subject matter of at least one of Examples 1-3, to include or use determining, using an Interacting Multiple Model (IMM), a third score indicating that the cyber sensor data indicates that the cyber threat is a combination of two or more known cyber threats.

Example 5 can include or use, or can optionally be combined with the subject matter of at least one of Examples 1-4, to include or use, wherein calculating the first score associated with the cyber sensor data indicating that a cyber threat is present in the network includes calculating, using a Kalman filter, the first score despite missing cyber sensor data that is expected to be detected from the cyber threat.

Example 6 can include or use, or can optionally be combined with the subject matter of at least one of Examples 1-5, to include or use determining a fourth score indicating that multiple cyber threats are present in the network based on the cyber sensor data using a multiple hypothesis management process.

Example 7 can include or use, or can optionally be combined with the subject matter of at least one of Examples 1-6, to include or use, wherein the cyber threat profile details a time range between each action performed by the cyber threat, and wherein the first score is further determined by comparing the time between cyber threat actions indicated by the cyber sensor data to the time range between corresponding actions detailed in the cyber threat profile.

Example 8 can include or use subject matter (such as an apparatus, a method, a means for performing acts, or a device readable memory including instructions that, when performed by the device, can cause the device to perform acts), such as can include or use (1) a network layout and vulnerability ingest module executable by one or more processors and configured to determine a network layout of a network based on received network layout data, the network layout data indicating connections between a plurality of nodes of the network, (2) a cyber sensor data module executable by the one or more processors and configured to receive cyber sensor data indicating actions performed on the plurality of nodes of the network, or (3) a prediction engine configured to calculate a first score associated with the cyber sensor data indicating that a cyber threat is present in the network by comparing a cyber threat profile of the cyber threat that details actions performed by the cyber threat to actions indicated by the cyber sensor data, determine whether the calculated first score is greater than a specified threshold; and determine that the cyber threat is present in response to determining the calculated first score is greater than the specified threshold.

Example 9 can include or use, or can optionally be combined with the subject matter of Example 8, to include or use, wherein the network layout and vulnerability ingest module is further configured to determine a vulnerability of a node of the plurality of nodes of the network, and wherein the prediction engine is further configured to modify the first score based on the proximity of the cyber threat to the vulnerability or based on the cyber threat being known to exploit the determined vulnerability.

Example 10 can include or use, or can optionally be combined with the subject matter of Example 9, to include or use, wherein the prediction engine is further configured to probabilistically determine a future track of the cyber threat based on the network layout, cyber threat profile, and the determined vulnerability, wherein the prediction engine is further configured to weight a second score of a given future track based on the cyber threat profile, the network layout, or an importance of the node to the performance of the network.

Example 11 can include or use, or can optionally be combined with the subject matter of at least one of Examples 9-10, to include or use, wherein the prediction engine is further configured to determine, using an Interacting Multiple Model (IMM), a third score that the cyber sensor data indicates that the cyber threat is a combination of two or more known cyber threats.

Example 12 can include or use, or can optionally be combined with the subject matter of at least one of Examples 9-11, to include or use, wherein the prediction engine configured to calculate the first score associated with the cyber sensor data indicating that a cyber threat is present in the network includes the prediction engine configured to calculate, using a Kalman filter, the first score despite missing cyber sensor data that is expected to be detected from the cyber threat as detailed in the cyber threat profile.

Example 13 can include or use, or can optionally be combined with the subject matter of at least one of Examples 9-12, to include or use, wherein the prediction engine is further configured to determine, using a multiple hypothesis management process, a fourth score indicating that multiple cyber threats are present in the network based on the cyber sensor data and a plurality of cyber threat profiles.

Example 14 can include or use, or can optionally be combined with the subject matter of at least one of Examples 9-13, to include or use, wherein the cyber threat profile details a time range between each action performed by the cyber threat, and wherein the prediction engine is further configured to determine the first score by comparing the time between cyber threat actions indicated by the cyber sensor data to the time range between corresponding actions detailed in the cyber threat profile.

The above Description of Embodiments includes references to the accompanying drawings, which form a part of the detailed description. The drawings show, by way of illustration, specific embodiments in which methods, apparatuses, and systems discussed herein can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or process described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

As used herein, a "-" (dash) used when referring to a reference number means "or", in the non-exclusive sense discussed in the previous paragraph, of all elements within the range indicated by the dash. For example, 103A-B means a nonexclusive "or" of the elements in the range {103A, 103B}, such that 103A-103B includes "103A but not 103B", "103B but not 103A", and "103A and 103B".

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Description of Embodiments as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for recognizing a cyber threat comprising:
   determining, using a processor, a network layout of a network based on received network layout data, the network layout data indicating connections between a plurality of nodes of the network;
   receiving cyber sensor data indicating actions performed on the plurality of nodes of the network;
   determining that the cyber sensor data does not sufficiently match known cyber threat profiles;
   determining, using an Interacting Multiple Model (IMM), one or more hybrid cyber threat profiles, the hybrid cyber threat profiles including a combination of portions of two or more of the known cyber threat profiles, each of the hybrid cyber threat profiles and the known cyber threat profiles indicating evidence left behind by an associated cyber threat and hybrid cyber threat, respectively, wherein the evidence includes two or more of a security or application log being created, a login attempt, a file or program being accessed, a program being run, determining a layout of at least a portion of the network, scanning, enumeration, gaining access to the network, escalating a user's privilege status;
   calculating, using the processor, a first score associated with the cyber sensor data indicating that the hybrid cyber threat is present in the network by comparing the cyber threat profile of the hybrid cyber threat to actions performed on the network as indicated by the cyber sensor data; and
   determining that the hybrid cyber threat is present in response to determining the calculated first score is greater than a specified threshold.

2. The method of claim 1, further comprising:
   determining a vulnerability of a node of the plurality of nodes of the network and modifying the first score based on the proximity of the cyber threat to the vulnerability and based on the cyber threat being known to exploit the determined vulnerability.

3. The method of claim 2, further comprising:
   probabilistically determining, using Multiple Hypothesis Tracking (MHT) and a Kalman filtering, a future track of the cyber threat based on the network layout, the hybrid cyber threat profile despite missing evidence as indicated in the hybrid cyber threat profile, and the determined vulnerability, wherein a second score of a given future track is weighted based on the cyber threat profile, the network layout, and an importance of the node to the performance of the network, the future track indicating a next node and action to be taken on the next node by the cyber threat.

4. The method of claim 3, wherein calculating the first score associated with the cyber sensor data indicating that a cyber threat is present in the network includes calculating, using a Kalman filter, the first score despite missing cyber sensor data that is expected to be detected from the cyber threat as detailed in the cyber threat profile.

5. The method of claim 4, further comprising determining a fourth score indicating that multiple cyber threats are present in the network based on the cyber sensor data using a multiple hypothesis management process.

6. The method of claim 5, wherein the cyber threat profile includes information detailing relative timing of when the evidence is left behind, and time between pieces of evidence being left behind, and the first score is further determined by comparing the time between cyber threat actions indicated by the cyber sensor data to the time range between corresponding actions detailed in the cyber threat profile.

7. A system for recognizing a cyber threat is present in a device network comprising:
   a network layout and vulnerability ingest module executable by one or more processors and configured to determine a network layout of the network based on received network layout data, the network layout data indicating connections between a plurality of nodes of the network;

a cyber sensor data module executable by the one or more processors and configured to receive cyber sensor data indicating actions performed on the plurality of nodes of the network; and a prediction engine configured to:

determine that the cyber sensor data does not sufficiently match known cyber threat profiles;

determine, using an Interacting Multiple Model (IMM), one or more hybrid cyber threat profiles, the hybrid cyber threat profiles including a combination of portions of two or more of the known cyber threat profiles, each of the hybrid cyber threat profiles and the known cyber threat profiles indicating evidence left behind by an associated cyber threat and hybrid cyber threat, respectively, wherein the evidence includes two or more of a security or application log being created, a login attempt, a file or program being accessed, a program being run, determining a layout of at least a portion of the network, scanning, enumeration, gaining access to the network, and escalating a user's privilege status;

calculate a first score associated with the cyber sensor data indicating that the hybrid cyber threat is present in the network by comparing the cyber threat profile of the hybrid cyber to actions performed on the network as indicated by the cyber sensor data; and determine that the hybrid cyber threat is present in response to determining the calculated first score is greater than a specified threshold.

8. The system of claim 7, wherein the network layout and vulnerability ingest module is further configured to determine a vulnerability of a node of the plurality of nodes of the network, and wherein the prediction engine is further configured to modify the first score based on the proximity of the cyber threat to the vulnerability and based on the cyber threat being known to exploit the determined vulnerability.

9. The system of claim 8, wherein the prediction engine is further configured to probabilistically determine, using Multiple Hypothesis Tracking (MHT) and a Kalman filtering process, a future track of the cyber threat based on the network layout, the hybrid cyber threat profile despite missing evidence as indicated in the hybrid cyber threat profile, and the determined vulnerability, wherein the prediction engine is further configured to weight a second score of a given future track based on the cyber threat profile, the network layout, and an importance of the node to the performance of the network, the future track indicating a next node and action to be taken on the next node by the cyber threat.

10. The system of claim 9, wherein the prediction engine configured to calculate the first score associated with the cyber sensor data indicating that a cyber threat is present in the network includes the prediction engine configured to calculate, using a Kalman filter, the first score despite missing cyber sensor data that is expected to be detected from the cyber threat as detailed in the cyber threat profile.

11. The system of claim 10, wherein the prediction engine is further configured to determine, using a multiple hypothesis management process, a fourth score indicating that multiple cyber threats are present in the network based on the cyber sensor data and a plurality of cyber threat profiles.

12. The system of claim 7, wherein the cyber threat profile includes information detailing relative timing of when the evidence is left behind, and a time range between pieces of evidence being left behind, and the prediction engine is further configured to determine the first score by comparing the time between cyber threat actions indicated by the cyber sensor data to the time range between corresponding pieces of evidence detailed in the cyber threat profile.

13. A non-transitory computer readable storage device including instructions for determining whether a cyber threat is present in a device network stored thereon, the instructions, which when executed by a machine, cause the machine to perform operations comprising:

receiving data detailing a network layout of the network, the network layout data indicating connections between a plurality of nodes of the network;

receiving cyber sensor data indicating actions performed on the plurality of nodes of the network;

determining that the cyber sensor data does not sufficiently match known cyber threat profiles;

determining, using an Interacting Multiple Model (IMM), one or more hybrid cyber threat profiles, the hybrid cyber threat profiles including a combination of portions of two or more of the known cyber threat profiles, each of the hybrid cyber threat profiles and the known cyber threat profiles indicating evidence left behind by an associated cyber threat and hybrid cyber threat, respectively, wherein the evidence includes two or more of a security or application log being created, a login attempt, a file or program being accessed, a program being run, determining a layout of at least a portion of the network, scanning, enumeration, gaining access to the network, escalating a user's privilege status;

calculating, using the processor, a first score associated with the cyber sensor data indicating that the hybrid cyber threat is present in the network by comparing the cyber threat profile of the hybrid cyber threat to actions performed on the network as indicated by the cyber sensor data; and determining that the hybrid cyber threat is present in response to determining the calculated first score is greater than a specified threshold.

14. The computer readable storage device of claim 13, further comprising instructions stored thereon, which when executed by the machine, cause the machine to perform operations comprising:

receiving data detailing a vulnerability of a node of the plurality of nodes of the network and modifying the first score based on the proximity of the cyber threat to the vulnerability and based on the cyber threat being known to exploit the determined vulnerability.

15. The computer readable storage device of claim 14, further comprising instructions stored thereon, which, when executed by the machine, cause the machine to perform operations comprising:

probabilistically determining, using Multiple Hypothesis Tracking (MHT) and a Kalman filtering process, a future track of the cyber threat based on the network layout, the hybrid cyber threat profile, and the determined vulnerability, wherein a second score of a given future track is weighted based on the cyber threat profile, the network layout, and an importance of the node to the performance of the network, the future track indicating a next node and action to be taken on the next node by the cyber threat.

16. The computer readable storage device of claim 15, wherein the instructions for calculating the score associated with the cyber sensor data indicating that a cyber threat is present in the network include instructions, which when executed by the machine, cause the machine to perform operations comprising calculating, using a Kalman filter, the first score despite missing cyber sensor data that is expected to be detected from the cyber threat as detailed in the cyber threat profile.

17. The computer readable storage device of claim 14, wherein the cyber threat profile includes information detailing relative timing of when the evidence is left behind, and time between pieces of evidence being left behind, and wherein the instructions for determining the first score further include instructions, which when executed by the machine, cause the machine to perform operations comprising determining the first score by comparing the time between cyber threat actions indicated by the cyber sensor data to the time range between corresponding evidence detailed in the cyber threat profile.

* * * * *